United States Patent
Rosen et al.

(10) Patent No.: US 10,753,257 B2
(45) Date of Patent: Aug. 25, 2020

(54) MOUNTING MAT FOR POLLUTION CONTROL ELEMENTS

(71) Applicant: 3M INNOVATIVE PROPERTIES COMPANY, St. Paul, MN (US)

(72) Inventors: Kerstin C. Rosen, Cologne (DE); Knut Schumacher, Neuss (DE); Tilo Remhof, Hilden (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/471,921

(22) PCT Filed: Dec. 18, 2017

(86) PCT No.: PCT/IB2017/058077
§ 371 (c)(1),
(2) Date: Jun. 20, 2019

(87) PCT Pub. No.: WO2018/116137
PCT Pub. Date: Jun. 28, 2018

(65) Prior Publication Data
US 2020/0102872 A1 Apr. 2, 2020

(30) Foreign Application Priority Data
Dec. 21, 2016 (EP) .................... 16205774

(51) Int. Cl.
*F01N 3/24* (2006.01)
*F01N 3/28* (2006.01)
*B23K 26/40* (2014.01)

(52) U.S. Cl.
CPC ............ *F01N 3/2803* (2013.01); *B23K 26/40* (2013.01); *F01N 3/2853* (2013.01)

(58) Field of Classification Search
CPC .... F01N 3/0211; F01N 3/2803; F01N 3/2839; F01N 3/2842; F01N 3/2853; F01N 3/2857; F01N 3/2864; F01N 2350/04
See application file for complete search history.

(56) References Cited

U.S. PATENT DOCUMENTS 4,929,429 A 5/1990 Merry
5,250,269 A 10/1993 Langer
(Continued)

FOREIGN PATENT DOCUMENTS

EP 2985435 2/2016
EP 3051185 8/2016
(Continued)

OTHER PUBLICATIONS

1507 Extended EP Search Report for EP16205774.9, PCT/US2014/039653, dated Apr. 11, 2017, 6 pages.
International Search report for PCT International Application No. PCT/IB2017/058077 dated Mar. 8, 2018, 5 pages.

*Primary Examiner* — Jonathan R Matthias
(74) *Attorney, Agent, or Firm* — Harold C. Knecht, III

(57) ABSTRACT

Mat (1) for mounting a pollution control element in a housing, comprising inorganic fibre material. At an edge surface (20) of the mat a plurality of fibres (30) are heat fused to form fusion volumes (90). The average number of fusion volumes per square millimetre of the edge surface is at least 100, and at least 80% of the fusion volumes have a projected size of between 10 μm and 100 μm.

18 Claims, 5 Drawing Sheets

(56) References Cited

U.S. PATENT DOCUMENTS

| | | | |
|---|---|---|---|
| 5,290,522 | A | 3/1994 | Rogers |
| 5,380,580 | A | 1/1995 | Rogers |
| 7,678,345 | B2 | 3/2010 | Goshima |
| 7,794,671 | B2 | 9/2010 | Kariya |
| 7,842,117 | B2 | 11/2010 | Ando |
| 7,951,731 | B2 | 5/2011 | Mitani |
| 8,133,443 | B2 | 3/2012 | Merry |
| 8,303,901 | B2 | 11/2012 | Tanahashi |
| 8,533,950 | B2 | 9/2013 | Eguchi |
| 9,148,986 | B2 | 9/2015 | Tippmann |
| 2004/0057879 | A1 | 3/2004 | Aizawa |
| 2009/0081455 | A1* | 3/2009 | Mitani ............ B23K 26/38 428/373 |
| 2009/0257925 | A1 | 10/2009 | Sugino |

FOREIGN PATENT DOCUMENTS

| | | |
|---|---|---|
| JP | 02289442 A * | 11/1990 |
| JP | 02289443 | 11/1990 |
| JP | 05293386 | 11/1993 |
| JP | 07251018 | 10/1995 |
| JP | 08057327 | 3/1996 |
| JP | 2002-221031 | 8/2002 |
| JP | 2012-237315 | 12/2012 |
| JP | 2013-170077 | 9/2013 |
| WO | WO 1999-046028 | 9/1999 |
| WO | WO 2001-083956 | 11/2001 |
| WO | WO 2003-031368 | 4/2003 |
| WO | WO 2006-055188 | 5/2006 |
| WO | WO 2015-049955 | 4/2015 |

* cited by examiner

MOUNTING MAT FOR POLLUTION CONTROL ELEMENTS

CROSS REFERENCE TO RELATED APPLICATIONS

This application is a national stage filing under 35 U.S.C. 371 of PCT/IB2017/058077, filed Dec. 18, 2017, which claims the benefit of EP Application No. 16205774.9, filed Dec. 21, 2016, the disclosure of which is incorporated by reference in their entirety herein.

FIELD

This disclosure relates to mats for mounting pollution control elements like catalyst bodies in housings, and in particular to such mats comprising fibre material comprising inorganic fibres. It also relates to pollution control devices comprising such mats, and to methods for forming such mats.

BACKGROUND

Pollution control devices are employed on motor vehicles to control atmospheric pollution. Such devices include catalytic converters and diesel particulate filters or traps. These devices include a pollution control element. For example, catalytic converters typically contain a ceramic or metal monolithic structure that supports the catalyst. The catalyst oxidizes carbon monoxide and hydrocarbons, and reduces the oxides of nitrogen in engine exhaust gases to control atmospheric pollution. In addition, diesel particulate filters or traps typically contain a wall flow filter in the form of a honeycombed monolithic structure, usually made from porous crystalline ceramic materials. Each of these devices has a metal housing (typically stainless steel) which holds or mounts the pollution control element. Such pollution control elements are typically fragile and susceptible to vibration or shock damage and breakage. The damaging forces may come from rough handling or dropping during engine assembly, from engine vibration or from travel over rough roads.

Such pollution control elements are also typically subject to damage due to high thermal shock, such as from contact with road spray. To protect the pollution control element, especially the ceramic monolithic type, and to prevent exhaust gases from passing between the pollution control element and the surrounding housing (thereby bypassing the catalyst or filter), mounting mats are disposed between the pollution control element and the housing. Some mounting mats and insulating elements (e.g., end cone insulation) include mostly inorganic fibres, with inorganic or organic binders, fillers and the like. Such mounting mats are commonly die cut, using metal blades, or laser cut out of larger sheets of inorganic fibre material.

Mounting mats such as the mats of the present disclosure are mostly cut out of a larger sheet of fibre material. It has been found that using a cutting blade or other such device to mechanically cut out mounting mats or insulation elements (e.g. end cone insulation) from such sheets of inorganic fibre material often results in the inorganic fibres being fractured or broken rather than actually cut. Because the fibres fracture, a substantial amount of fibre dust results from the mechanical cutting operation. The generation of dust from binder and/or filler materials may result as well. Such dust remains in the cut-out mats. Later, when the mounting mat or end cone insulation is incorporated into the pollution control device, dust escapes from the fibre material of the mat and can cause itching or skin irritation problems for the workers handling these mats. It is therefore desirable to reduce the amount of fibres and dust exiting the mat through its edge surfaces. The present disclosure is directed to reducing the amount of dust that escapes from such mats, especially while being handled during a pollution control device assembly operation.

Attempts to solve this problem have been made before. The international patent application WO 2006/055188 A1, for example, mentions inorganic fibre mounting and insulating sheet materials for use in pollution control devices with at least one edge of the inorganic fibre sheet material having at least one group of two or more fibres fused together.

Similarly, the U.S. Pat. No. 7,951,731 B2 addresses a problem of fibre scattering and, in one aspect, mentions an inorganic fibre mat including an inorganic fibre aggregated body which includes inorganic fibres, where at least a part of the inorganic fibres located on a surface of the inorganic fibre aggregate body is fused to each other by heat.

SUMMARY

The present disclosure attempts to provide an improvement to such prior mounting mats.

The present disclosure provides a mat for mounting a pollution control element in a housing, wherein the mat comprises a fibre material comprising inorganic fibres and defining first and second opposed major surfaces of the mat, and at least one edge surface connecting the major surfaces at a portion of their peripheries, wherein the edge surface defines an edge plane, and at which edge surface a plurality of the inorganic fibres of the fibre material are heat fused such as to form a plurality of fusion volumes, wherein each fusion volume has a projected size, defined by the longest geometric extension of a parallel projection of the fusion volume onto the edge plane, and wherein the average number of fusion volumes per square millimetre of the edge plane is at least 100, characterized in that at least 80% of the fusion volumes have a projected size of between 10 µm and 100 µm.

A pollution control element, as referred to herein, may be a catalyst carrier, e.g. a ceramic or metal monolithic structure that supports the catalyst. The pollution control element is mounted in a housing, which may be a metal housing. To provide a large amount of surface area, catalyst carriers generally have very thin walls. The thin walls can cause the catalyst carriers to be fragile and susceptible to breakage. Additionally, in some embodiments, the catalyst carrier can have a coefficient of thermal expansion about an order of magnitude less than that of housing. This is particularly the case when the housing is formed of a metal, usually stainless steel, and the catalyst carrier is a ceramic. The difference in thermal properties can subject the catalyst carrier to risk of damage with changes in temperature. A mounting mat according to the present disclosure, disposed between the housing and the catalyst carrier, helps protect the catalyst carrier from damage due to road shock and vibration and/or the thermal expansion difference. Such mounting mats also help prevent exhaust gases from passing between the pollution control element and the metal housing.

It has been discovered that partially sealing the edge surface of a mat according to this disclosure, comprising inorganic fibre material (i.e. fibre material comprising inorganic fibres), can be done in specific ways such that the shedding of fibre dust, i.e. of scattered broken fibres, and/or other debris particles, from inside the mat through the edge surface into the ambient air is reduced. In a mounting mat according to the present disclosure a reduced amount of entrapped broken fibres and other particles leaves the mat while the mat is being handled during a pollution control device assembly operation. Consequently, it is believed that workers handling such mats will have reduced itching and less skin irritation problems.

The amount of shedding is determined in a so-called fibre loss test described below.

In accordance with the present disclosure, a mat is provided for mounting a pollution control element in a housing, wherein the mat may be cut from a sheet of inorganic fibre material via a laser beam or mechanically, e.g. by a blade, by a die or by a wire. The inorganic fibre material sheet may be a sheet of non-woven material.

The present inventors have surprisingly found that a sufficiently high number of sufficiently large fusion volumes closes the edge surface, at least partially, by blocking potential migration paths of fibre dust from inside the mat through the edge surface to ambient air outside the mat. When investigating the problem, it appeared that a high-enough density of fusion volumes alone, i.e. number of fusion volumes per square millimetre of edge surface, is not sufficient to achieve efficient closing of the edge surface. Neither a large-enough size (i.e. projected size) of fusion volumes alone achieves efficient closing of the edge surface. The inventors of the present invention have rather discovered that a combination of density and size of fusion volumes provides efficient closing of the edge surface and thereby reduces the amount of fibre dust emerging from the mat.

For partially sealing an edge surface of a mat according to the present disclosure, the edge surface may be subjected to a heat treatment. The heat treatment may be done, for example, via a laser beam or via a heated element, via a flame, or via heated gas. Where the heat treatment of an edge surface is performed using a laser, the heat treatment may be performed by, or simultaneously with, a laser cutting process for generating the edge surface. In such a scenario, the laser cutting process generating an edge surface, using suitably chosen laser settings, may provide fusion volumes at that edge surface of a suitable density and projected size for reducing shedding through that edge surface.

The heat treatment may cause groups of two or more fibres at the edge surface to fuse together. It may also cause portions of single fibres, i.e. fibres that are not fused with other fibres, to become enlarged, or exhibit rounded shapes such as, for example, mushroom-shaped portions. In a location where one or more fibres are fused, the fused portions of fibres form a "fusion volume" that extends in three dimensions. A fusion volume may thus be located at a single fibre or at a location where two or more fibres are fused together. In any case, the fused portions of fibres are clearly discernible from unfused portions in microphotographs due to their shape and extension. A fusion volume comprises the fused portions of the fibre(s) in one fusion location, and does not comprise unfused portions of fibres. Fusion volumes typically have irregular shapes, although many are remotely spherical.

Heat fusion of fibres is a random process, where the size—and the projected size—of a fusion volume on a specific fibre is not predictable. Also, a thicker fibre will generate a larger-size fusion volume than a thinner fibre, when heat-fused under appropriate conditions. In order to clarify the counting method for determining density of fusion volumes, a feature on a fibre of the inorganic fibre material, generated by a heat-fusing, is only considered a fusion volume if its projected size (including the projected size of the fibre) is at least 35% larger than the average diameter of the fibres forming the inorganic fibre material, as specified by the manufacturer of the material. For example, if a fibre material is specified to be made of fibres having an average diameter of 6.0 µm, after heat-fusing only features having a projected size of at least 8.1 µm are considered to be fusion volumes, and counted as such when determining density and percentages.

Parameters that are believed to affect shedding performance, i.e. weight loss through fibre dust, are the density of fusion volumes, i.e. their number per square millimetre of the edge surface, and the percentage of larger fusion volumes (i.e. fusion volumes having projected sizes of between 10 µm and 100 µm) within the total number of fusion volumes. If either the density of fusion volumes, regardless of their projected size, is below a threshold of 100 per square millimetre ($mm^2$), or if the percentage of larger fusion volumes is below a threshold of 80%, shedding of dust is higher.

A mat according to the present disclosure comprises inorganic fibre material. The entire mat may comprise inorganic fibre material, or the mat may comprise a portion of inorganic fibre material. The mat may have further portions not comprising inorganic fibre material. The inorganic fibre material from which one or more mounting mats according to the present disclosure may be cut may comprise between about 85 percent and 100 percent by weight inorganic fibres, based on the total weight of the material, and between about 0 percent to about 15 percent by weight binder material, based on the total weight of the material. The fibres may be selected from the group consisting of polycrystalline fibres, ceramic fibres, silica fibres, biosoluble fibres, glass fibres and blends thereof. The fibres may have a length of from about 2 mm to about 150 mm.

A binder material, if provided, may be selected from the group consisting of organic binders, inorganic binders, and mixtures thereof. Suitable organic binder materials include aqueous polymer emulsions, solvent based polymer solutions, and polymers or polymer resins (100% solids). Aqueous polymer emulsions are organic binder polymers and elastomers in the latex form, for example, natural rubber latices, styrene-butadiene latices, butadiene-acrylonitrile latices, ethylene vinyl acetate latices, and latices of acrylate and methacrylate polymers and copolymers. Polymer and polymer resins include natural rubber, styrene-butadiene rubber, and other elastomeric polymer resins. Acrylic latex and polyvinyl acetate organic binders may be preferred. Inorganic binders may include clay materials such as bentonite, boehmite, colloidal silicas and mixtures thereof. The binder may be sprayed onto the outer surfaces of the fibre material or may be incorporated throughout the thickness of the fibre material. It is also contemplated that the fibre material may be stitchbonded or needle-punched. Stitch-bonded or needle-punched mats may be with or without a binder.

The fibre material may have a thickness of between about 2 mm and 25 mm, and a weight/area of between about 200 $g/m^2$ to about 4000 $g/m^2$. Examples of inorganic fibre mounting mat material capable of being cut via a laser beam are disclosed in U.S. Pat. Nos. 4,929,429, 5,250,269, 5,290,522, and 5,380,580, published U.S. Patent Application US 2004/0057879 and International Publication No. WO 03/031368 A2.

A mat according to the present disclosure comprises a first and an opposed second major surface, and an edge surface connecting the major surfaces at a portion of their peripheries. When the mat is arranged flat, the edge surface may be orthogonal to the major surfaces. Alternatively it may form an angle of between 1° and 89° with one of the major surfaces.

An edge of a fibre material is generally not a solid edge. Rather it is formed by individual fibres which extend from the interior of the material up to the edge, some fibres may even extend beyond the edge to an outside of the mat. An edge may thus be fuzzy. A cut edge, however, is normally not fuzzy. Cutting a mat from fibre material, e.g. using a laser beam or a blade, will generate a well-defined edge of the mat beyond which edge no fibres extend. The envelope, i.e. the geometric surface beyond which no fibres extend is referred to herein as the edge surface of the mat.

Depending on the cutting geometry, the edge surface may define a geometric plane, the "edge plane". Generally, mats in the form of a mathematical prism have edges which define edge planes. In other cutting geometries, the edge surface may be a surface that is curved in one dimension, resembling the curved surface of a cylinder. Such curved edge surfaces may be generated, for example, when cutting a mat to a circular or elliptical shape. This present disclosure is not limited to mats where all edges define planes, and specifically includes mats where one edge surface or two or more or all edge surfaces are curved in one dimension or not curved at all.

In general terms, for a sample area at an edge surface curved in one dimension, the edge plane is a geometric plane through the point of the edge surface closest to the center of the sample area, whose surface normal is parallel to the surface normal of the edge surface at the center of the sample area. Where the edge surface is flat, the edge plane is the geometric plane defined by the edge surface.

The projected size of a fusion volume is determined, according to the present disclosure, by a geometric parallel projection of the fusion volume onto a geometric plane (the edge plane) and by determining the longest geometric extension of the projection. This parallel projection is a projection orthogonal to the edge plane. It can be realized, for example, by taking a microphotograph of the fusion volume, from a sufficiently large distance and with the central viewing axis of the microphotography camera or microscope being directed towards the fusion volume and orthogonal to the edge plane. Using the microphotograph, the longest extension, e.g. in μm, of the fusion volume in the edge plane can be determined by determining the longest extension of the image of the fusion volume in the microphotograph and applying the scaling factor of the microphotograph. A suitable scale in the microphotograph may help determining the longest extension in μm or other suitable units of length. The resolution of the camera should allow to resolve at least features of 1/10 μm. The longest extension of the projection of a fusion volume, so determined, is considered the projected size of the fusion volume, for the purposes of the present disclosure.

The average number of fusion volumes per $mm^2$ of the edge plane is determined by taking a microphotograph of a sample area of the edge surface with a suitable geometry, e.g. from a sufficient distance, to avoid image distortions and with the central imaging axis orthogonal to the edge surface at the centre of the sample area, then using the microphotograph to determine the size of the sample area in $mm^2$, and then to count the projections of the fusion volumes within the sample area, lastly divide their number by the area size. Fusion volumes at the margin of the sample area are counted only if their geometric centre, as determined in the microphotograph, lies within the sample area. As mentioned before, features are not considered to be fusion volumes if their projected size (including the projected size of the fibre) is smaller than 135% of the average diameter of the fibres forming the inorganic fibre material, as specified by the manufacturer of the fibre material. Such features are thus disregarded.

The same microphotograph can be used to determine the projected size of the fusion volumes. For each fusion volume in the sample area, the longest extension of its projection on the edge plane is measured in the photograph and recorded as the projected size of this fusion volume. The number of fusion volumes in the sample area of projected sizes between 10 μm and 100 μm is then divided by the total number of fusion volumes in the sample area. Fusion volumes having a projected size of exactly 10 μm or exactly 100 μm are considered to have projected sizes of between 10 μm and 100 μm. Multiplied by 100, the ratio yields the percentage of fusion volumes having a projected size of between 10 μm and 100 μm.

In an aspect of the disclosure, the inorganic fibres of the fibre material have specific nominal diameters. In certain embodiments, the fibres of the fibre material have a nominal average diameter of between 4.5 μm and 6.5 μm, such as 5.5 μm. In certain embodiments the fibres have a nominal average diameter of 5.5 μm. "Average diameter", in the context of this disclosure, refers to the arithmetic mean of the fibre diameters. Most fibre material manufacturers specify the nominal average diameter for their materials. In certain embodiments, the inorganic fibres have a nominal average diameter of between 2.0 μm and 10.0 μm. Fibres of nominal average diameters within these ranges typically have good mechanical properties for good holding properties of the mat and suitable thermal properties for adequate thermal insulation of typical pollution control elements, while still featuring reduced shedding after heat treatment.

In another aspect of this disclosure, the mat has a specific thickness. In certain embodiments, the mat has a thickness of between 0.5 cm and 5.0 cm, e.g. 1.2 cm, 2.0 cm or 2.5 cm, in an uncompressed state. Although a mat comprising fibre material may have different thicknesses in different locations of the mat, caused by variations in the material, one thickness value can be attributed to the entire mat. The thickness of a mat comprising fibre material defining first and second parallel opposed major surfaces, in the context of the present disclosure, is the maximum distance between these surfaces. This maximum distance is determined in an uncompressed state of the mat, e.g. before compressing the mat or portions of it. It is advantageous to determine the thickness of a mat when the mat is laid out flat. In certain embodiments, the mat has a thickness of between 1.0 cm and 3.0 cm. For mats for mounting a pollution control element in a housing, these thickness ranges provide for a good balance between their holding and thermal insulation properties on one hand, and space requirements on the other hand, while still featuring reduced shedding after heat treatment.

In certain embodiments, the mat according to the present disclosure has a thickness of between 10 mm and 15 mm in an uncompressed state, and the fibre material is a nonwoven material. Nonwoven mats of this thickness have been found to provide a good balance between mechanical holding power, thermal stability and conductivity, and space requirements in use. Thicker mats may require the housing, in which the pollution control element is mounted by the mat, to be larger.

In a further aspect of the present disclosure, the fibre material may have different structures. In certain embodiments, the fibre material is a nonwoven material. Nonwoven fibre materials provide good performance with respect to holding power, thermal insulation, and shedding at competitive cost. In other embodiments, the fibre material is a woven or knitted material.

In a yet further aspect of the disclosure, the fibre material may have a certain mass per area, also referred to as mass density herein. In certain embodiments, the fibre material has a mass density of between 500 grams per square metre ($g/m^2$) and 8000 $g/m^2$, for example 1000 $g/m^2$, 2000 $g/m^2$ or 3000 $g/m^2$. In certain embodiments, the fibre material has a mass density of between 1000 $g/m^2$ and 4000 $g/m^2$. These ranges provide for a good balance between holding power of the mat and its thermal properties, while still featuring reduced shedding after heat treatment as disclosed herein.

In another aspect, the inorganic fibres may comprise fibres of different materials. In some embodiments, the inorganic fibres are alumina fibres or comprise alumina fibres. In other embodiments, the inorganic fibres are silica fibres or comprise silica fibres. In other embodiments, the inorganic fibres are alumina-silica fibres or comprise alumina-silica fibres. In a further embodiment, the inorganic fibres comprise alumina fibres and silica fibres. In a yet further embodiment, the inorganic fibres comprise alumina fibres and alumina-silica fibres, and in a further embodiment, the inorganic fibres comprise silica fibres and alumina-silica fibres. Generally, the inorganic fibres may comprise alumina fibres and/or silica fibres and/or alumina-silica fibres. Mats comprising fibre material of such types of fibres and of such mixtures of fibres have shown satisfying mechanical and thermal properties at elevated temperatures, while featuring reduced shedding after heat treatment as disclosed herein.

In a further aspect of this disclosure, the heat fusing of fibres of the fibre material may be performed using different techniques. By analysing the structure of the fusion volumes, their density distribution per unit area, and their size distribution, and comparing to previously heat fused edge surfaces of similar fibre materials, one technique employed for heat treatment of a given mat may be discernible from other techniques. In certain embodiments, the plurality of inorganic fibres are heat fused by laser radiation. Laser radiation, e.g. radiation from a $CO_2$ laser or from a Nd:YAG laser, is a particularly versatile method for heat fusing fibres, because laser output power, laser focus and advancement speed along the edge surface to be treated can often be varied easily in order to obtain the average number of fusion volumes per square millimetre of edge plane and projected size distribution (at least 80% between 10 and 100 μm) for reduced fibre shedding as per the present disclosure.

In other embodiments, the plurality of inorganic fibres are heat fused by exposing them to a flame. In other embodiments, the plurality of fibres are heat fused by contacting them with a heated element. In certain ones of these embodiments, the plurality of fibres are heat fused by contacting them with a heated mechanical cutting blade that cuts the mat, at the edge surface of the mat, from a larger sheet of fibre material and thereby generates the edge surface.

In certain embodiments of the present disclosure, the fibre material is a nonwoven material. In some of these embodiments, the fibres of the fibre material are alumina-silica fibres having a nominal average diameter of 5.5 μm, and the edge surface is a geometric plane. These parameters, in combination, may provide a particularly useful mat which has good mechanical holding power to hold a pollution control element in a housing, adequate thermal stability at typical temperatures in a pollution control device, and exhibits low fibre shedding when heat-treated as described herein. A plane edge surface is particularly easy to treat with heat in order to achieve the required density and size distribution of fusion volumes.

In one aspect, the present disclosure provides a pollution control device comprising a housing, a pollution control element arranged in the housing, and a mat as described herein, the mat being arranged in a gap between at least a portion of the housing and a portion of the pollution control element.

The present disclosure also provides a method of forming a mat for mounting a pollution control element in a housing, wherein the mat comprises a fibre material comprising inorganic fibres and defining first and second opposed major surfaces of the mat, and at least one edge surface connecting the major surfaces at a portion of their peripheries, wherein the edge surface defines an edge plane. The method is characterized by comprising a step of applying heat to the edge surface a) in such a manner, that a plurality of fibres of the inorganic fibre material at the edge surface are heat fused such as to form a plurality of fusion volumes, wherein each fusion volume has a projected size, defined by the longest geometric extension of a parallel projection of the fusion volume onto the edge plane, and b) in such a manner that the average number of fusion volumes per square millimetre of the edge plane is at least 100, and c) in such a manner that at least 80% of the fusion volumes have a projected size of between 10 μm and 100 μm.

Performing the method results in a mat that exhibits advantageous shedding properties, because the heat-treated edge surface is "closed" or sealed at least partially, whereby shedding of fibre dust, i.e. of scattered broken fibres and other debris particles, from inside the mat through the edge surface into the ambient air is reduced.

Certain parameters of the heat fusing process can be varied to obtain the desired average number of fusion volumes per square millimetre of the edge plane and the minimum percentage of "larger" fusion volumes (i.e. those of a projected size of between 10 μm and 100 μm).

A first such parameter is the heating power: Where heat fusing is done using a laser beam, the laser output power can be increased to obtain, within a certain output power range, larger and fewer fusion volumes or decreased to obtain smaller and more fusion volumes. Overly large fusion volumes, however, are too heavy to be supported by the fibres, may easily detach from the fibre when the mat is handled, and disappear from the edge surface. Where heat fusing is done using a heated element contacting the edge surface or using a flame, that element or the flame may have a higher or a lower temperature, resulting in larger or smaller fusion volumes.

As a second parameter, the laser focus setting can be adjusted, A defocussing of the laser beam leads to a more diffuse, less concentrated laser beam, which can result, within a certain focus range, in more, but smaller fusion volumes per unit area.

A third parameter, that can be varied, is the heating time. Where heat fusing is done using a laser beam, the laser beam can be steered along the edge surface at a lower or at a higher speed, in order to obtain, within a certain speed range, larger and fewer fusion volumes or smaller and more fusion volumes, respectively. Where heat fusing is done using a heated element contacting the edge surface, that element may be moved along the edge surface at a lower or at a higher speed, in order to obtain, within a certain speed range, larger and fewer fusion volumes or smaller and more fusion volumes, respectively.

Further to these and potentially other parameters of the heat fusing process, the properties of the inorganic fibres at the edge surface determine, to some extent, the conditions of the heat fusing process required to obtain the desired average number of fusion volumes per square millimetre of the edge plane and the minimum percentage of "larger" fusion volumes:

Fibres having a higher heat conductivity will require more energy (more power, stronger focus, heating time) from the heat fusing process to melt and form fusion volumes, because more of the heat is conducted away from the edge surface by the fibre before the heat can melt a portion of a fibre. Fibre material having a higher fibre density will tend to require more energy than a material having a lower density, because there will be more contact points of a fibre with adjacent fibres over which heat can be conducted away from the edge surface before the heat can fuse a portion of the fibre.

Similarly, fibres being equipped with a coating will normally require more energy (more power, stronger focus, longer heating time) from the heat fusing process to melt and form fusion volumes, because a part of the energy is needed to heat and melt the coating. Along the same line, where fibres at the edge surface are heat fused right after being soaked in water, more energy is required to generate the required number and density of "larger" fusion volumes, because a part of the energy is needed to heat and evaporate the water.

In the methods according to the present disclosure, the heat fusing of fibres at the edge surface can be performed, for example, by a laser beam or via a heated element, via a flame, or via heated gas. Therefore, in one aspect of the present disclosure, in some of the methods described herein, the step of applying heat to the edge surface is performed using a laser. In certain embodiments, the laser is a laser emitting predominantly infrared radiation, e.g. a $CO_2$ laser, a Nd:YAG laser or an infrared fibre laser.

Where a laser is used to apply heat to the edge surface, the advancement speed of the laser beam relative to the mat can be adjusted in order to achieve the required average density of fusion volumes at the edge surface and their required projected size distribution as described herein. In certain embodiments of the methods described herein, the laser beam advancement speed relative to the mat is between 0.2 metres per second (m/s) and 2.0 m/s. Such advancement speeds, in combination with suitably chosen laser power and laser focus settings, have been found advantageous for heating the edge surface of a mat according to the present disclosure such as to form the desired number and density of fusion volumes.

Generally, a step of generating the edge surface, e.g. by cutting, may be performed before the step of heat fusing fibres at the edge surface. However, the step of applying heat to the edge surface may be performed by, or simultaneously with, a cutting process for generating the edge surface. In a scenario where cutting is done using a laser, the laser cutting process generating the edge surface, using suitably chosen laser settings, may provide fusion volumes at that edge surface of a suitable density and projected size for reducing shedding through that edge surface, as disclosed herein.

Also where the heat treatment of the edge surface is performed mechanically (as opposed to via a laser) using a heated element, the heat fusing may be performed by, or simultaneously with, a mechanical cutting process for generating the edge surface. The heated element may be operable to perform the mechanical cutting of the edge surface and the heat fusing of fibres at the edge surface simultaneously. In such a scenario, the mechanical cutting process generating the edge surface, using suitably chosen temperature and contact time settings, may provide fusion volumes at that edge surface of a suitable density and projected size for reducing shedding through that edge surface, as disclosed herein. The heated element may be a heated cutting blade, a heated die or a heated cutting wire, for example.

So generally, in certain embodiments of the methods described above, the step of applying heat to the edge surface is performed by, or simultaneously with, a cutting process for generating the edge surface.

Alternatively, in the methods described herein, a step of generating the edge surface may be performed before the step of applying heat to the edge surface. So the method described above may further comprise a step of generating the edge surface, this step being performed before the step of applying heat to the edge surface. Generating the edge surface may be done, for example, by cutting using a blade, a wire or a die, while the step of applying heat to the edge surface may be done, for example, via a laser.

It has been found that—surprisingly—water soaking of the edge surface just before or even during heat fusing can have a beneficial effect: With the edge surface soaked with water just before or during heat fusing, the edge surface after heat fusing exhibits fewer fusion volumes. Accordingly, in certain embodiments of the methods described herein, these methods may further comprise a step of soaking a portion of the mat comprising the edge surface with water. This step may be performed before the step of applying heat to the edge surface. The additional step may be performed after a step of generating the edge surface.

Where the steps of generating the edge surface, e.g. by cutting, and of applying heat to the edge surface are performed simultaneously, a portion of a sheet of fibre material from which the mat is formed, comprising the future edge surface of the mat, may be soaked with water, before generating the edge surface.

BRIEF DESCRIPTION OF THE DRAWINGS

The invention will now be described in more detail with reference to the following Figures exemplifying particular embodiments of the invention.

DETAILED DESCRIPTION

Figure 1:
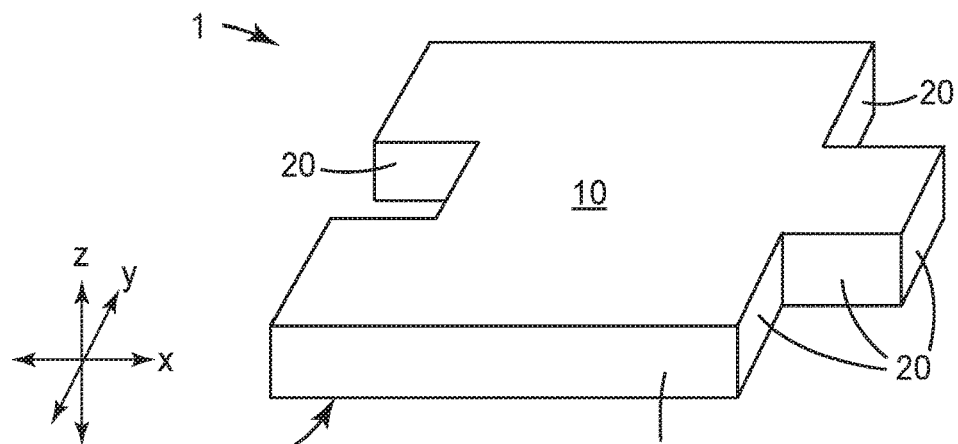
FIG. 1 Perspective sketch of a first mat for mounting a pollution control element.

Referring to FIGS. 1-4, the geometry of a mat for mounting a pollution control element in a housing is illustrated, and terms used herein are explained. FIG. 1 is a perspective sketch of a mat 1 for mounting a pollution control element in a housing. The mat 1 comprises a fibre material (not shown in FIG. 1) comprising inorganic fibres. The fibre material defines a first, upper major surface 10 and an opposed second, lower major surface 11. Several edge surfaces 20, of which some are not visible, connect the major surfaces 10, 11 at their peripheries.

The mat 1 is shown flat, that is to say, its parallel opposite major surfaces 10, 11 extend in width directions x and in length directions y. In use, the mat 1 is generally wrapped circumferentially around a pollution control element.

Figure 2:
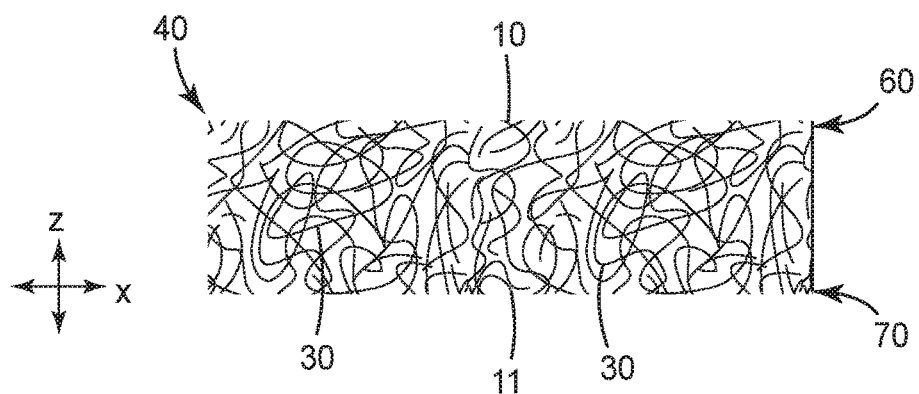
FIG. 2 Sketched side view of the first mat, in more detail.

FIG. 2 shows an edge of the mat 1 in a sketched side view in more detail. The mat 1 comprises a non-woven fibre material comprising inorganic fibres 30, of which only two fibres are provided with reference numbers, to enhance clarity. Fibres 30 in the material extend, in the thickness direction z, to an upper portion 60 of the mat 1, and in the opposite thickness direction −z up to a lower portion 70. In one of the width directions, fibres 30 extend to an edge portion 40. The fibres 30 as such form an open structure at the edge portion 40.

Figure 3:
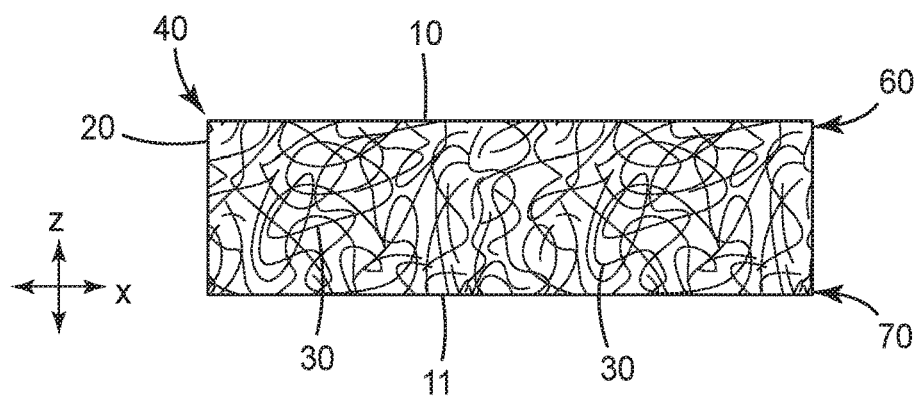
FIG. 3 Sketched side view of the first mat.

While FIG. 2 is an illustration of the physical fibres 30, FIG. 3 additionally shows the envelope surfaces defined by the fibres 30. The end points of fibres 30 at the edge portion 40 define a surface, the edge surface 20, which is a geometric plane, enveloping the ends of the fibres 30 at the edge portion 40 and extending orthogonal to the drawing plane. The edge surface 20 delimits the mat 1 in width direction −x.

Similarly, the end points of fibres 30 at the upper portion 60 of the mat 1 define a surface, the upper major surface 10, which is a geometric plane enveloping the ends of the fibres 30 at the upper portion 60. The end points of fibres 30 at the lower portion 70 of the mat 1 define a surface, the lower major surface 11, which is a geometric plane enveloping the ends of the fibres 30 at the lower portion 70. The upper and lower major surfaces 10, 11 delimit the mat 1 in thickness directions ±z.

Figure 4:
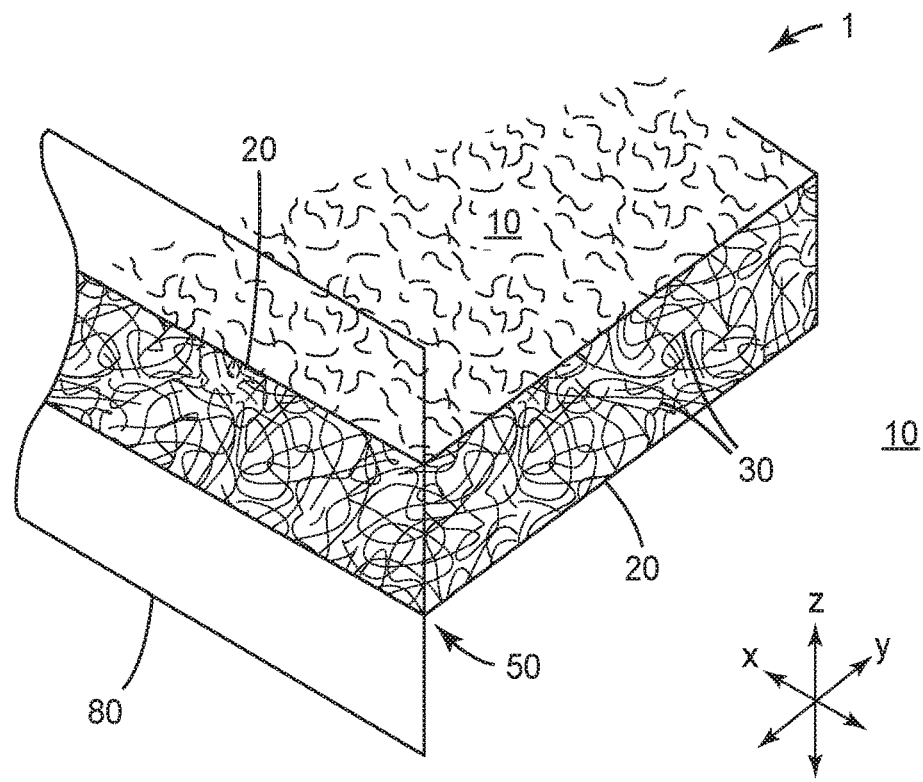
FIG. 4 Sketched perspective view of a corner of the first mat.

FIG. 4 shows, in a perspective sketch, a corner of the mat 1 in detail. Two edge surfaces 20 are visible, which meet at the corner 50 of the mat 1. The edge surfaces 20 are geometric planes, orthogonal to each other, formed by cutting the mat 1 with a laser beam out of a larger sheet of fibre material. For the left-hand edge surface 20, the edge plane 80 is shown. It is a virtual geometric plane, defined by the edge surface 20. In FIG. 4, only the edge plane 80 of the left-hand edge surface 20 is shown, however, also the right-hand edge surface 20 defines its own edge plane, which is not drawn for clarity.

While an edge surface 20 may be curved in certain mats, for example in circular mats, the edge plane 80 is always a plane and serves as a projection plane to determine projected size of fusion volumes, as will be explained in the following.

Fusion volumes are not shown in the sketched views of FIGS. 1-4, because their typical projected sizes are in the range of 10 µm to 100 µm, which is too small to be visible with the unaided eye from viewing distances like the ones used for FIGS. 1-4.

Figure 5:
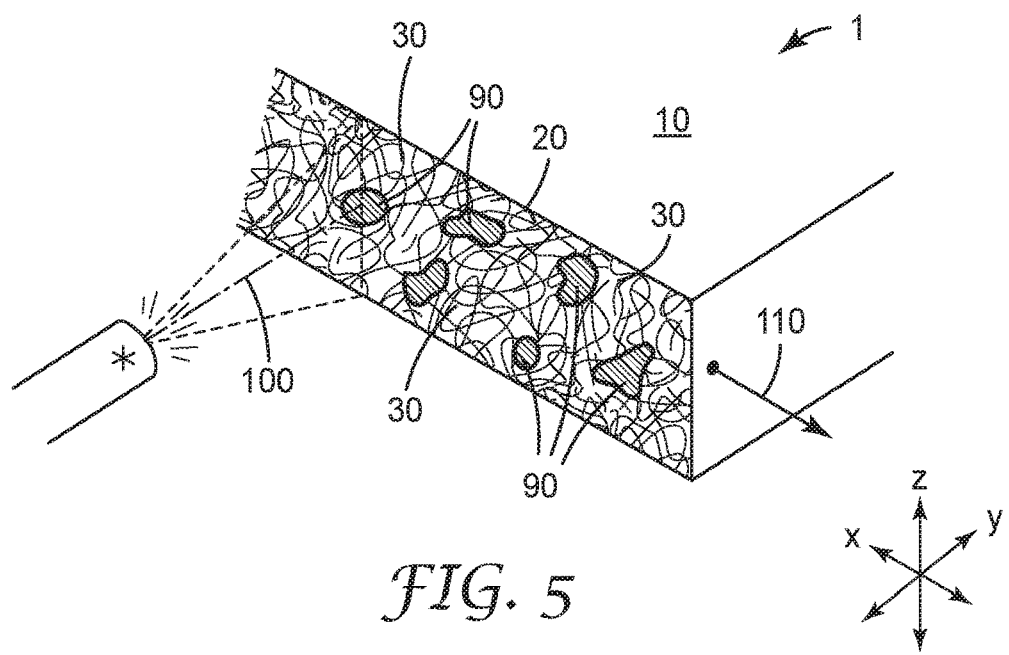
FIG. 5 Perspective sketch of a mat according to the disclosure, showing fusion volumes generated in heat treating the edge surface.

FIG. 5 illustrates, in a perspective sketch, a way of performing heat treatment of an edge surface 20 of a mat 1 according to the invention with an infrared laser. The laser beam 100 is directed orthogonally towards the edge surface 20. In order to cover the entire edge surface 20, the laser beam 100 scans the edge surface 20 in z direction, while the mat 1 is transported linearly in +x direction indicated by arrow 110. Alternatively, the laser could be moved relative to the mat 1, or the laser beam 100 could scan in ±x directions. As the laser beam 100 scans over the edge surface 20 and heats the fibre material, fibres 30 are heat-fused, either alone or with other fibres 30, and form fusion volumes 90 at the edge surface 20. The laser beam scan pattern is a pattern of parallel vertical lines on the edge surface 20. The horizontal spacing between two subsequent scan lines ("grid space") can be varied. A suitable typical value for grid space with a 300 Watt $CO_2$ laser is 0.8 mm. The vertical speed with which the laser beam 100 scans along each vertical scan line can be adjusted, too. A suitable typical scan speed value for a 300 W $CO_2$ laser is 1 m/s.

The laser can be operated with a front optics for focussing the laser beam 100. In order to obtain more and smaller fusion volumes 90, however, the edge surface 20 is not arranged in the focal plane of the laser front optics, but a few centimetres behind the laser beam focus. This also results in acceleration of the heat treatment, because the slightly defocused laser beam 100 covered a greater area of the edge surface 20 than a focussed beam. The distance between the focal plane of the laser beam 100 and the edge surface 20, measured along the beam 100, is referred to herein as "focus distance". A suitable typical value for the focus distance is 60 mm. By using the laser beam 100 out of its focus, the beam diameter on the edge surface 20 is larger, so that a larger portion of the edge surface 20 can be heat fused at the same time.

Figure 6:
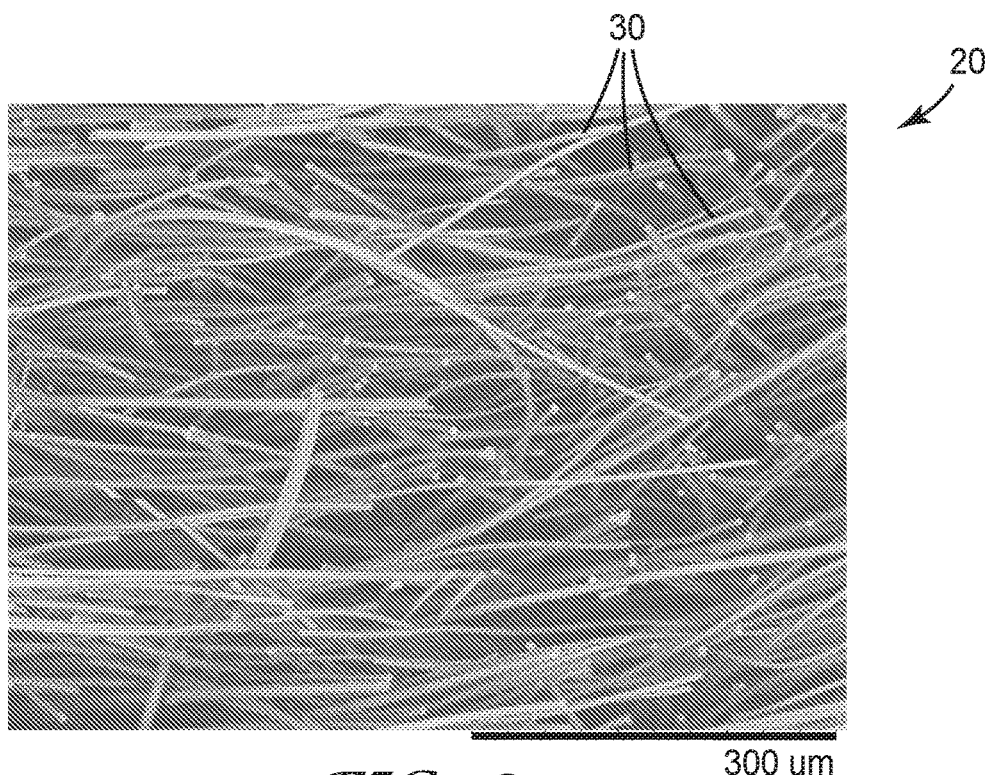
FIG. 6 Microphotograph of an edge surface of an untreated mat.

FIGS. 7-10 show images of inorganic fibres 30 of the fibre material at respective edge surfaces 20, heat fused to form fusion volumes 90 which appear as white structures of generally circular, but rather irregular shape. FIG. 6 shows an edge surface 20 of an untreated fibre material not exhibiting any fusion volumes.

FIGS. 6-10 are microphotographs, taken with a scanning electron microscope viewing orthogonally at the edge surface 20, in order to minimize distortion of the image. The Figures show portions of edge surfaces 20 of sample mats made from the same fibre material, but having been subjected to different heat treatment or to no heat treatment at all. The edge surfaces 20 were generated by die cutting a sheet of inorganic fibre material having a weight of 2200 g/m². The fibres 30 of that material had a nominal average diameter of 5.5 µm. A $CO_2$ laser of 300 Watt nominal power was used for heat treatment. The microphotographs contain minute indications of the projected sizes of certain fusion volumes 90.

FIG. 6 is a microphotograph, taken with a scanning electron microscope, of an edge surface 20 which has not been subjected to heat treatment. The entire horizontal bar below the bottom right corner of the photograph indicates a length of 300 µm.

Figure 7:
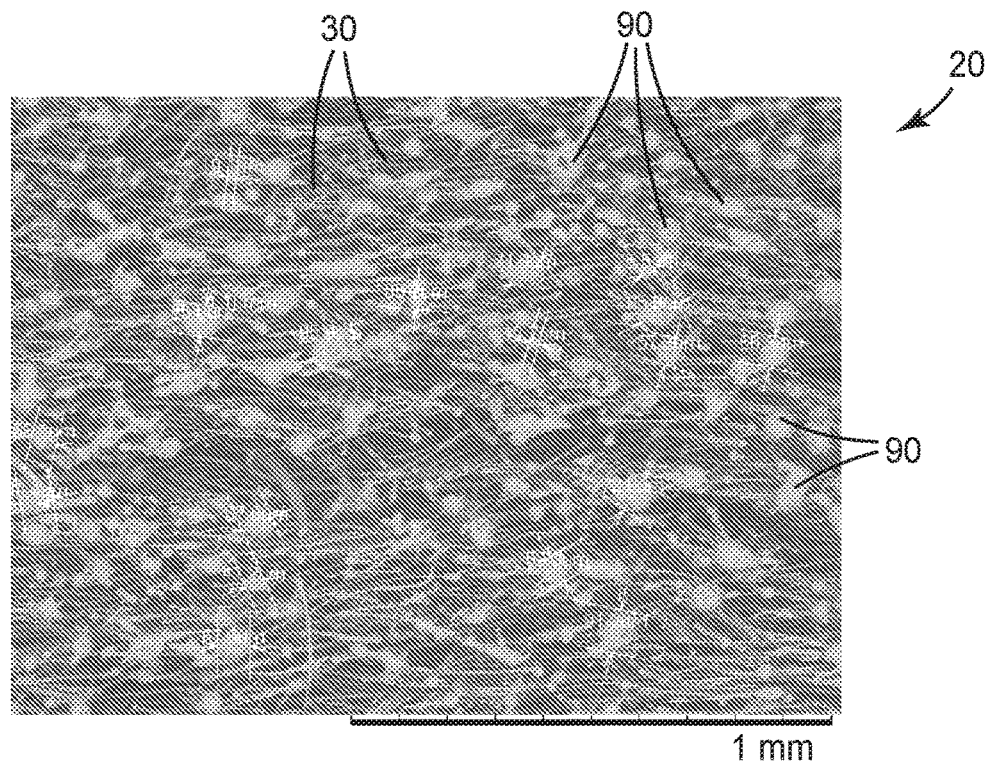
FIG. 7 Microphotograph of an edge surface of a heat-treated mat according to the present disclosure, having 109 fusion volumes in a 1 $mm^2$ sample area.

FIG. 7 is a microphotograph of an edge surface 20 of a mat 1 according to the present disclosure, after heat treatment according to the present disclosure. The photograph shows inorganic fibres 30 of the fibre material, heat fused to form fusion volumes 90, which appear as white structures of generally circular, but rather irregular shape. The laser was operated at a grid space of 0.8 mm, a scan speed of 1 m/s and a focus distance of 60 mm.

The solid bar at the bottom right corner corresponds to a length of 1 mm on the edge surface 20 and indicates the scale of the microphotograph being about 1:60 (depending on how it is reproduced). The microphotograph thus covers an area of approximately 1.7 mm by 1.3 mm of the edge surface 20.

A 1 mm×1 mm area of the heat-treated edge surface 20 shown in FIG. 7 was analyzed for number and projected size of the fusion volumes 90. There were 109 fusion volumes identified. 100 of these (92%) had a projected size of between 10 μm and 100 μm. When the Fibre Loss Test described herein was performed on a sample of this material, a weight loss of 0.21% was measured. These results were entered into Table 1 as "Example 1".

Figure 8:
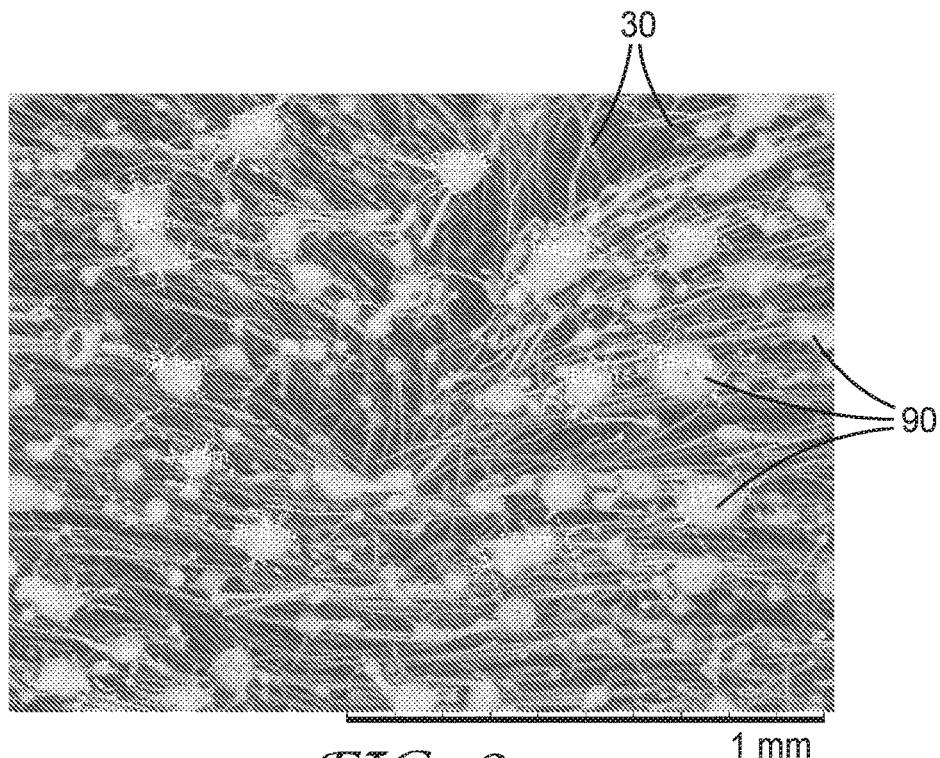
FIG. 8 Microphotograph of an edge surface of a heat-treated mat according to the present disclosure, having 104 fusion volumes in a 1 $mm^2$ sample area.

FIG. 8 is a microphotograph of an edge surface 20 of a mat 1 according to the present disclosure, after heat treatment, different from the heat treatment of the edge surface 20 described in relation to FIG. 7. The laser was operated at a grid space of 0.8 mm, a scan speed of 1 m/s and a focus distance of 40 mm. The solid bar at the bottom right corner indicates a length of 1 mm on the edge surface 20 and indicates the scale of the microphotograph.

A 1 mm×1 mm area of the heat-treated edge surface 20 shown in FIG. 8 was analyzed for number and projected size of the fusion volumes 90. There were 104 fusion volumes 90 identified. 102 of these (98%) had a projected size of between 10 μm and 100 μm. When the Fibre Loss Test described herein was performed on a sample of this material, a weight loss of 0.28% was measured. These results were entered into Table 1 as "Example 2".

Figure 9:
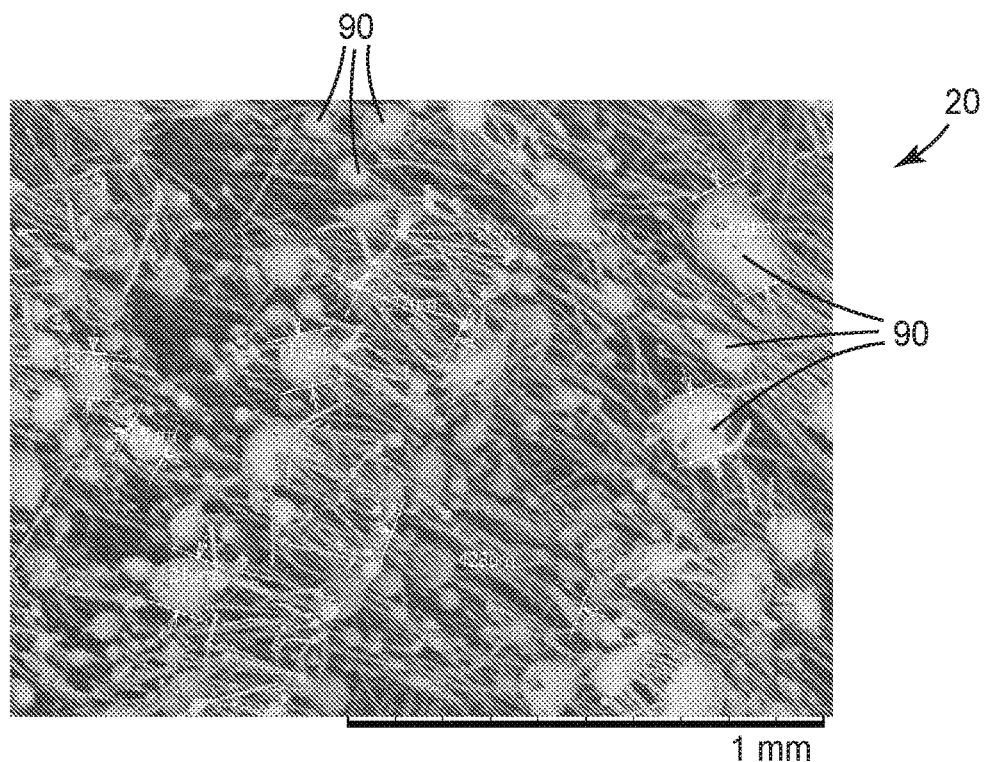
FIG. 9 Microphotograph of an edge surface of a heat-treated mat, having 40 fusion volumes in a 1 $mm^2$ sample area.

FIG. 9 is a microphotograph of an edge surface 20 of a further mat. The edge surface 20 of this mat has been heat treated, but different from the heat treatment of the edge surfaces 20 described in relation to FIGS. 7 and 8. In order to produce the edge surface 20 shown in FIG. 9, the laser was operated at a grid space of 0.8 mm, a scan speed of 1 m/s and a focus distance of only 10 mm. The solid bar at the bottom right corner indicates a length of 1 mm on the edge surface 20 and indicates the scale of the microphotograph.

A 1 mm×1 mm area of the heat-treated edge surface 20 shown in FIG. 9 was analyzed for number and projected size of the fusion volumes 90. There were 40 fusion volumes 90 identified. 14 of these (35%) had a projected size of between 10 μm and 100 μm. Most fusion volumes 90 had a projected size of more than 100 μm. When the Fibre Loss Test described herein was performed on a sample of this material, a weight loss of 0.45% was measured. These results were entered into Table 1 as "Comparative Example 1".

Figure 10:
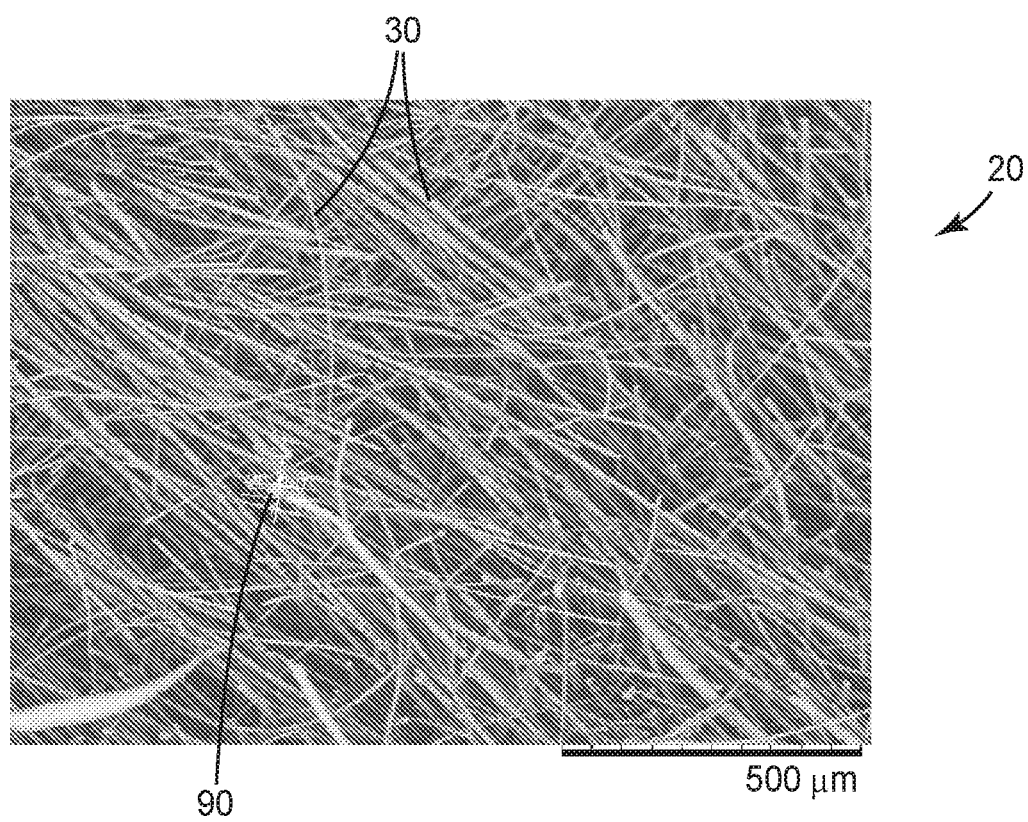
FIG. 10 Microphotograph of an edge surface of a heat-treated mat, having 12 fusion volumes per mm².

FIG. 10 is a microphotograph of an edge surface 20 of a further mat. The edge surface 20 of this mat has been heat treated in the same way as the edge surface described in the context of FIG. 7. However, the edge surface 20 shown in FIG. 10 was sprayed with water before heat treating. In order to produce the edge surface 20 shown in FIG. 10, the laser was operated at a grid space of 0.8 mm, a scan speed of 1 m/s and a focus distance of 40 mm. The solid bar at the bottom right corner indicates a length of 500 μm on the edge surface 20 and indicates the scale of the microphotograph.

Probably due to uneven water spraying, fusion volumes were created mainly in the bottom portion of the area shown in the photograph. A 1 mm×1 mm area in the bottom portion of the heat-treated edge surface 20 shown in FIG. 10 was analyzed for number and projected size of the fusion volumes 90. There were only 12 fusion volumes 90 identified. 11 of these (92%) had a projected size of between 10 μm and 100 μm. Most fusion volumes 90 within this size range had a projected size of only slightly over 10 μm. When the Fibre Loss Test described herein was performed on a sample of this material, a weight loss of 0.99% was measured. These results were entered into Table 1 as "Comparative Example 3".

It is noted that the water spray resulted in a mat having inferior shedding properties, compared to the mat of FIG. 7, which was treated using the same laser settings, but without water spray.

EXAMPLES

Samples of mats were prepared from an alumina-silica fibre sheet denominated "Maftec MLS2" from Mitsubishi Plastics Inc. The sheet had a base weight of 2150 g/m$^2$ and a thickness of about 12.5 mm. The fibres had a nominal average diameter of 5.5 μm. The sheet was spray impregnated with a slurry of organic binder (Acronal A273 S from BASF) and inorganic particles (Boehmite powder available under the name Dispal 23n4-80 from company Sasol). Fifteen square-shaped samples, each sized 50 mm×50 mm, were cut out of the sheet using a die and grouped into five sample groups, each containing three samples.

Samples in sample group 5 were sprayed with water prior to heat treatment, in order to obtain fewer and larger fusion volumes.

All four edge surfaces of the samples of sample groups 1-5 were heat-fused using a laser beam of 9.7 μm wavelength, generated in a 300 W $CO_2$ laser of Rofin-Baasel GmbH&Co. KG. The laser beam was oriented orthogonal to the edge surface and scanned the edge surface in a pattern of parallel vertical lines being separated by a horizontal spacing referred to as "grid space", with a linear speed in a direction along the vertical lines of 1 m/s.

In order to obtain different sizes of fusion volumes and different size distributions, different laser settings for focus distance and grid space were used:

Example 1

Sample group 1, focus distance=60 mm, grid space=0.8 mm;

Example 2

Sample group 2, focus distance=40 mm, grid space=0.8 mm;

Comparative Example 1

Sample group 3, focus distance=10 mm, grid space=0.8 mm;

Comparative Example 2

Sample group 4, focus distance=60 mm, grid space 0.6 mm;

Comparative Example 3

Sample group 5, focus distance=40 mm, grid space=0.8 mm.

After heat fusion, the heat-treated edge surfaces of all samples within a sample group looked generally similar and rather uniform. A portion of an edge surface of one sample of each sample group was analyzed by taking microphotographs using an electron microscope TM3000 from Hitachi. To avoid image distortions, the imaging direction of the microscope was set orthogonal to the edge surface in the middle of the photographed portion of the edge surface. For each fusion volume shown in a portion of the microphotographs corresponding to a 1 mm×1 mm area on the edge surface, the projected size was determined by measuring the length of the longest geometric extension of the fusion volume in the microphotograph, applying the scaling factor of the photo, and thereby obtaining the real projected size of each fusion volume, as projected in the photographic parallel projection onto the edge surface. The process of measuring the length of the longest geometric extension was done by a human on a computerized version of the microphotograph, using available tools for measuring length in image processing software. Only those features were considered fusion volumes and were taken into account that had a projected size of more than 7.5 μm. The projected size of each fusion volume was rounded to the closest integer number, which was entered into a list.

The average number of fusion volumes per square millimetre of the edge plane was determined by counting the number of entries in the list.

The ratio of fusion volumes having a projected size of between 10 μm and 100 μm was determined by dividing the number of those fusion volumes in the 1 mm×1 mm area having a projected size of between 10 μm and 100 μm (including those fusion volumes having a projected size of exactly 10 μ or exactly 100 μm) by the number of all fusion volumes in the 1 mm×1 mm area. The percentage was obtained by multiplying this ratio number with 100.

Fibre shedding performance of sample groups 1-5 was then evaluated using the fibre loss test described below. Each sample of each sample group was tested in the fibre loss test. Each sample yielded a shedding percentage, expressed as weight loss in percent. The higher the weight loss, the higher the amount of fibre dust exiting the sample, so that a higher weight loss corresponds to a less desired shedding performance. The weight loss percentage of the three samples of a sample group were added and divided by three to yield a shedding performance for the sample group. Table 1 summarizes the results.

TABLE 1

| Sample group | Average number of fusion volumes per mm² | Percentage of fusion volumes per mm² having projected size 1-10 μm | Shedding weight loss |
|---|---|---|---|
| Example 1 | 1 | 109 | 92% | 0.21% |
| Example 2 | 2 | 104 | 98% | 0.28% |
| Comparative Example 1 | 3 | 40 | 35% | 0.45% |
| Comparative Example 2 | 4 | 101 | 74% | 0.35% |
| Comparative Example 3 | 5 | 12 | 92% | 0.99% |

The table confirms that samples having an average of at least 100 fusion volumes per mm² of the edge plane and, simultaneously, of which fusion volumes at least 80% have a projected size of between 10 μm and 100 μm exhibit a superior shedding performance of less than 0.30%. Based on this data, it is believed that heat treatment of edge surfaces of mounting mats according to the present disclosure will result in a lower amount of fibre dust loss when the mats are handled during a pollution control device assembly operation, as compared to untreated mounting mats.

Test Method "Fibre Loss Test"

The fibre loss test is used to determine the amount of fibre shedding, that is the percentage, by weight, of fibre that is lost by a fibre material comprising inorganic fibres on impact due to fibre shedding. The test fixture is the device according to the Japanese Standard JIS K-6830-1996, as revised 1996-04-01. This device has a fixed vertical frame connected by hinges at the top to a second frame having approximately the same dimensions as the fixed frame. The second frame can be pivoted about the hinges with respect to the fixed frame, whereby it moves outwardly at the bottom to form an angle with the fixed frame at the top that is defined by the fixed frame and the second frame.

A test sample of fibre material measuring 50 mm by 50 mm is weighed, and then clamped onto a mounting plate attached to the bottom of the second frame, with one of the edge surfaces facing downward. The mounting plate is even with the bottom of the second frame so that the mat and plate do not extend beyond the peripheral edges of second frame.

To perform the test, the second frame is pivoted upward to form a 45 degree angle with the fixed frame and released so that it strikes the fixed frame. The impact of the plate striking the frame causes any fibre dust and other debris to fall off of the sample. The sample is removed and weighed, and test results are reported in percent weight loss as follows:

[(Tared weight−Weight after striking frame)/(Tared weight)]×100=Percent Fibre Loss, wherein "tared weight" is the weight of the sample prior to being clamped onto the mounting plate of the second frame.

The invention claimed is:

1. A mat comprising:
    a fibre material comprising inorganic fibres and defining first and second opposed major surfaces of the mat, and at least one edge surface connecting the major surfaces at a portion of their peripheries, wherein the edge surface defines an edge plane,
    and at which edge surface a plurality of the inorganic fibres of the fibre material are heat fused such as to form a plurality of fusion volumes,
    wherein each fusion volume has a projected size, defined by the longest geometric extension of a parallel projection of the fusion volume onto the edge plane,
    and wherein the average number of fusion volumes per square millimetre of the edge plane is at least 100,
    characterized in that at least 80% of the fusion volumes have a projected size of between 10 μm and 100 μm.

2. The mat of claim 1, wherein the fibres of the fibre material have a nominal average diameter of between 4.5 μm and 6.5 μm.

3. The mat of claim 1, wherein the mat has a thickness of between 0.5 cm and 5.0 cm, in an uncompressed state.

4. The mat of claim 1, wherein the fibre material is a nonwoven material.

5. The mat of claim 1, wherein the fibre material has a mass density of between 500 g/m² and 8000 g/m².

6. The mat of claim 1, wherein the inorganic fibres comprise alumina fibres and/or silica fibres and/or alumina-silica fibres.

7. The mat of claim 1, wherein the plurality of inorganic fibres are heat fused by laser radiation.

8. The mat of claim 1, wherein the fibre material is a nonwoven material, wherein the fibres of the fibre material are alumina-silica fibres having a nominal average diameter of 5.5 μm, and wherein the edge surface is a geometric plane.

9. The mat of claim 1, having a thickness of between 10 mm and 15 mm in an uncompressed state, wherein the fibre material is a nonwoven material.

10. A device comprising the mat of claim 1, the mat being arranged in a gap between opposing elements.

11. The device of claim 10, wherein said device is a pollution control device, one opposing element is a housing, the other opposing element is a pollution control element arranged in the housing, and the mat is arranged in a gap between at least a portion of the housing and a portion of the pollution control element.

12. The mat of claim 1, wherein said mat is for mounting a pollution control element in a housing.

13. A method of forming a mat,
wherein the mat comprises a fibre material comprising inorganic fibres and defining first and second opposed major surfaces of the mat, and at least one edge surface connecting the major surfaces at a portion of their peripheries, wherein the edge surface defines an edge plane, the method comprising a step of applying heat to the edge surface
a) in such a manner, that a plurality of fibres of the inorganic fibre material at the edge surface are heat fused such as to form a plurality of fusion volumes, wherein each fusion volume has a projected size, defined by the longest geometric extension of a parallel projection of the fusion volume onto the edge plane, and
b) in such a manner that the average number of fusion volumes per square millimetre of the edge plane is at least 100, and
c) in such a manner that at least 80% of the fusion volumes have a projected size of between 10 μm and 100 μm.

14. The method of claim 13, wherein the step of applying heat to the edge surface is performed using a laser.

15. The method of claim 13, wherein the step of applying heat to the edge surface is performed by, or simultaneously with, a cutting process for generating the edge surface.

16. The method of claim 13, further comprising a step of generating the edge surface, this step being performed before the step of applying heat to the edge surface.

17. The method of claim 13, further comprising a step of soaking a portion of the mat comprising the edge surface with water, this step being performed before the step of applying heat to the edge surface.

18. The method of claim 13, wherein said method is for forming a mat for mounting a pollution control element in a housing.

* * * * *